Jan. 11, 1949.  E. C. CORK  2,458,565
APPARATUS FOR MEASURING FIELD INTENSITY
IN HIGH-FREQUENCY ELECTRIC FIELDS
Filed April 18, 1945
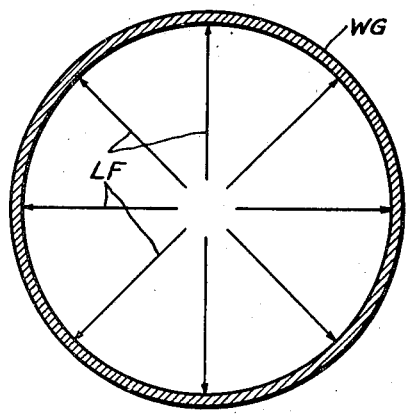
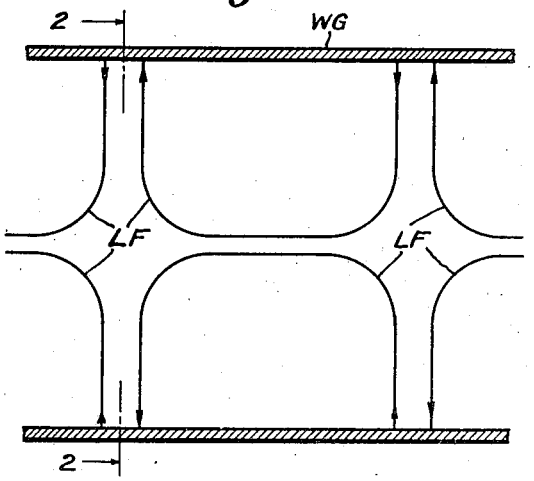
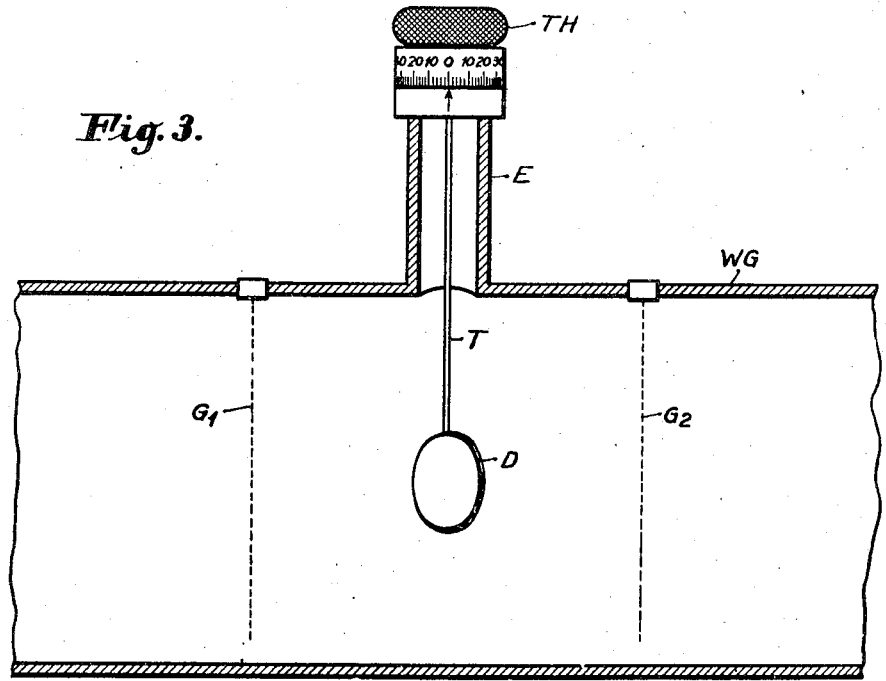
INVENTOR.
Edward Cecil Cork
BY H. S. Grover
ATTORNEY.

Patented Jan. 11, 1949

2,458,565

UNITED STATES PATENT OFFICE 2,458,565

APPARATUS FOR MEASURING FIELD INTENSITY IN HIGH-FREQUENCY ELECTRIC FIELDS

Edward Cecil Cork, Ealing, London, England, assignor to Electric & Musical Industries Limited, Hayes, England, a company of Great Britain Application April 18, 1945, Serial No. 589,067
In Great Britain September 25, 1941

Section 1, Public Law 690, August 8, 1946
Patent expires September 25, 1961

4 Claims. (Cl. 171—95)

This invention relates to apparatus for obtaining an indication of the intensity of a high-frequency electric field. The invention is of particular application to the measurement of the electric field intensity due to electric waves in a wave guide, such guides being particularly suitable for the transmission of wavelengths of the order of centimetres, which in general travel along the interior of the guide.

The object of the present invention is to provide an improved apparatus for measuring the intensity of a high-frequency electric field in a wave guide, said apparatus absorbing only a negligible quantity of energy and producing negligible disturbance of the waves transmitted along the guide.

In its broadest aspect the invention includes a source of high-frequency electric waves and means for obtaining an indication of the intensity of the electric field due to said waves, said means comprising an element responsive to said field and of small dimensions compared with the wavelength of said waves and mounted so as to be capable of angular displacement about an axis and so disposed in said field that said field acts on said element so as to cause said element to be subjected to a couple about said axis, the magnitude of said couple affording an indication of the intensity of the electric field.

The invention further includes apparatus comprising an electric wave guide and means for obtaining an indication of the intensity of the electric field in said guide due to high-frequency electric waves in said guide, said means comprising an element responsive to said field of small dimensions compared with the wavelength of said waves and mounted so as to be capable of angular displacement about an axis and so disposed in said guide as to be subjected to a couple about said axis due to said field, the magnitude of said couple affording an indication of the intensity of the electric field.

In accordance with a further aspect, the invention includes apparatus comprising a section of an electric wave guide and means for obtaining an indication of the intensity of the electric field in said section if high-frequency electric waves exist therein, said means comprising an element responsive to said field and of small dimensions compared with the diameter of said guide and mounted so as to be capable of angular displacement about an axis within said guide and capable of being positioned within said section so as to be subjected to a couple about said axis due to said field, the magnitude of said couple affording an indication of the intensity of the electric field.

If it is desired to measure the power of the wave in the wave guide, then a plurality of conducting elements may be suspended within the guide at predetermined distances apart in relation to the wavelength of the waves passing along the guide.

In order that the said invention may be clearly understood and readily carried into effect, the same will now be more fully described with reference to the accompanying drawing, in which:

Figure 1 is a longitudinal sectional view through a wave guide showing the direction of the electric lines of force when a simple type of electric wave is being transmitted through the guide.

Figure 2 is a transverse section of the conductor shown in Figure 1 on the plane 2, 2, of Figure 1.

Figure 3 is a diagrammatic longitudinal sectional view of the wave guide of Figures 1 and 2 provided with apparatus for measuring the intensity of the high-frequency electric field developed by electric waves transmitted through the guide.

Referring to Figures 1 and 2 of the drawing, it will be seen that the wave guide WG shown is a cylindrical tube of copper or other electrical conducting material arranged with its axis horizontal. Electric waves propagating along such a guide set up oscillatory electric fields within the dielectric material such as air within the guide. In the case where a wave is propagated in the simplest mode the electric lines of force form a pattern such as that represented by the arrow headed full lines LF drawn within the guide WG in Figures 1 and 2, the axial component of the electric force being a maximum at the axis of the guide.

In order to measure the intensity of the high-frequency electric field at any point within the wave guide WG, an element, preferably a disc, is mounted in the guide at or near the point at which it is desired to make measurement as shown in Figure 3. The disc shown at D is suspended by thread T of quartz or similar material from a torsion head TH mounted at the upper end of a vertical tubular extension E of the guide so that the disc is capable of angular movement about a vertical axis, the centre of the disc lying on the axis of the guide where the maximum intensity of the axial electric field is to be expected for the simple mode referred to. The suspension of the disc D is also such that a line perpendicular to the plane of the disc makes an angle of approximately 45° with the axis of the guide.

With this arrangement, when an axial high-frequency electric field is set up in the neighbourhood of the disc D, the disc experiences a couple about its vertical axis of suspension tending to cause the disc to be angularly displaced so as to bring its plane parallel to the axis of the wave guide, and this couple affords an indication of the intensity of the high-frequency field, being proportional to the square of the intensity of the electric field and also proportional to the dimensions of the disc. The couple on the disc may be measured by any suitable method, for example, by allowing the disc to be deflected against the torsion of the suspension and measuring the angle of deflection. Preferably, however, the couple is measured by rotating the torsion head to restore the disc to its original position at an angle of 45° to the axis of the hollow conductor, since in this angular position with respect to the field the couple on the disc has its maximum value. As will be appreciated from comparison of Figures 1 and 3, the diameter of the disc D is small compared with the diameter of the guide, the diameter of the guide being comparable with the wavelength of the waves propagated along the guide, so that the disc will present no serious obstruction to the wave.

Although the constant of proportionality between the aforesaid couple and the square of the intensity of the electric field can normally be calculated, it may be more easy in practice to determine the constant by calibrating the displacement of the disc by a known low-frequency or steady electrostatic field. For this purpose grids such as $G_1$ or $G_2$ may be provided on each side of the disc and projecting within the guide between which suitable known potential differences can be established. The grids $G_1$ and $G_2$ are removed from the guide when the guide is in use for wave transmission. If standing waves exist in the guide in which the field intensity is to be measured, the disc D of Figure 3 should be placed at a point where the longitudinual electric force is a maximum to obtain a maximum reading.

Since the laws of distribution of the electric forces over the cross-section of a wave guide are known, it is possible to calculate the total displacement current after having ascertained the electric field intensity from the displacement of the disc.

If desired, the tubular extension E, the torsion head TH, the disc D and the suspension T therefor, can be arranged to be shifted longitudinally with respect to the guide whereby the electric force at various positions along the guide can be determined.

It will be understood that if the electric waves in the guide are propagated in a mode which does not give a maximum electric force on the axis of the guide the disc may be suspended so as to lie off the axis in a region where the electric field is a maximum, said disc being arranged to be capable of rotation about an axis lying in its own plane and at right angles to the direction of said field and also arranged so that a line perpendicular to its plane is inclined at an angle substantially 45° to the direction of said field.

A wave guide such as WG acts in a manner analogous to a high-frequency transmission line and thus has an equivalent characteristic impedance, so that the electric field intensity at any point of the guide affords an indication of the magnitude of the power at the point. For example, this power can be determined in terms of the characteristic impedance of the guide and the measured electric field intensity along the guide, for example, at three points spaced by one-eighth (or an odd integral multiple) of the wavelength of the waves propagated within the guide or, alternatively, at two points coinciding respectively with the maximum and minimum electric force and spaced apart an effective quarter of a wavelength.

The apparatus according to the invention may be employed for the purpose of calibrating other devices to be employed for measuring the electric force or the power flowing along a wave guide. For example, the apparatus according to the invention may be employed for calibrating a crystal detector and for such purpose the crystal detector may be provided with a probe adapted to project into the wave guide so as to be capacity-coupled thereto. If standing waves exist in the guide, it is necessary to place the crystal at a position a quarter of a wavelength away from the conducting disc, since the disc affords a maximum reading where the longitudinal electric force is a maximum, whilst the crystal affords a maximum indication where the radial field is a maximum. The apparatus according to the invention may also be employed for the calibration of thermocouples.

What I claim is:

1. Apparatus comprising a section of an electric wave guide and means for obtaining an indication of the intensity of the electric field in said section if high-frequency electric waves exist therein, said means comprising an element responsive to said field and of small dimensions compared with the diameter of said guide and mounted so as to be capable of angular displacement about an axis within said guide and capable of being positioned within said section so as to be subjected to a couple about said axis due to said field, the magnitude of said couple affording an indication of the intensity of the electric field said element being a conducting disc arranged to be capable of angular movement about an axis lying in its own plane and at right angles to the direction of said field, said disc being also arranged so that a line perpendicular to its plane is inclined at an angle substantially 45° to the direction of said field, said apparatus including means for applying an opposite couple to said disc so as to restore it to its original position after deflection by said electric field.

2. Apparatus comprising a section of an electric wave guide and means for obtaining an indication of the intensity of the electric field in said section if high-frequency electric waves exist therein, said means comprising an element responsive to said field and of small dimensions compared with the diameter of said guide and mounted so as to be capable of angular displacement about an axis within said guide and capable of being positioned within said section so as to be subjected to a couple about said axis due to said field, the magnitude of said couple affording an indication of the intensity of the electric field, said element being a conducting disc arranged to be capable of angular movement about an axis lying in its own plane and at right angles to the direction of said field, said disc being also arranged so that a line perpendicular to its plane is inclined at an angle substantially 45° to the direction of said field, said apparatus including means for applying an opposite couple to said disc so as to restore it to its original position after deflection by said electric field, said electric wave guide being provided with removable conductive grids for closing off said guide at each side of said field responsive element, said grids adapted to have known potential differences applied thereto whereby said apparatus may be calibrated.

3. Apparatus comprising a section of an electric wave guide and means for obtaining an indication of the intensity of the electric field in said section if high frequency electric waves exist therein, said means comprising an element responsive to said field and of small dimensions compared with the diameter of said guide and mounted so as to be capable of angular displacement about an axis within said guide and capable of being positioned within said section so as to be subjected to an electrostatic torque about said axis due to said field, the magnitude of said torque affording an indication of the intensity of the electric field, said element being a conducting disc arranged to be capable of angular movement about an axis lying in its own plane and at right angles to the direction of said field, said disc being also arranged so that a line perpendicular to its plane is inclined at an angle substantially 45° to the direction of said field, said apparatus including means for applying an opposite torque to said disc so as to restore it to its original position after deflection by said electric field.

4. Apparatus comprising a section of an electric wave guide and means for obtaining an indication of the intensity of the electric field in said section if high frequency electric waves exist therein, said means comprising an element responsive to said field and of small dimensions compared with the diameter of said guide and mounted so as to be capable of angular displacement about an axis within said guide and capable of being positioned within said section so as to be subjected to an electrostatic torque about said axis due to said field, the magnitude of said torque affording an indication of the intensity of the electric field, said element being a conducting disc arranged to be capable of angular movement about an axis lying in its own plane and at right angles to the direction of said field, said disc being also arranged so that a line perpendicular to its plane is inclined at an angle substantially 45° to the direction of said field, said apparatus including means for applying an opposite torque to said disc so as to restore it to its original position after deflection by said electric field, said electric wave guide being provided with removable conductive grids for closing off said guide at each side of said field responsive element, and said grids being adapted to have known potential differences applied thereto whereby said apparatus may be calibrated.

EDWARD CECIL CORK.

REFERENCES CITED

The following references are of record in the file of this patent:

UNITED STATES PATENTS

| Number | Name | Date |
|---|---|---|
| 1,705,560 | Edwards | Mar. 19, 1929 |

FOREIGN PATENTS

| Number | Country | Date |
|---|---|---|
| 5,202 | Great Britain | 1883 |
| 548,681 | Great Britain | Oct. 20, 1942 |